Figure 1:
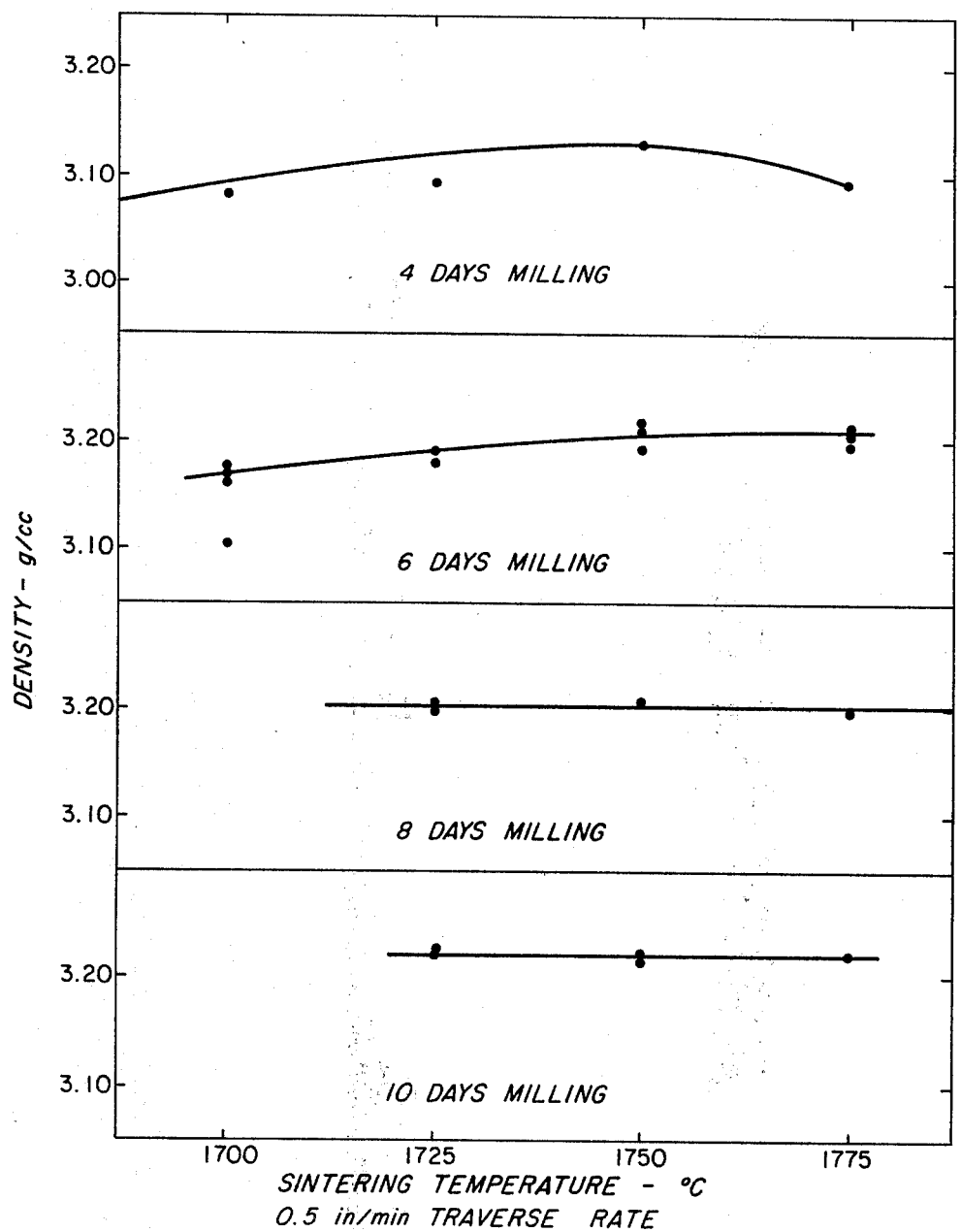

United States Patent [19]
Powers

[11] 3,972,480
[45] Aug. 3, 1976

[54] METHOD OF PREPARING A SUSPENSION OF ADDITIVE-FREE BETA-ALUMINA PARTICLES

[75] Inventor: Robert W. Powers, Schenectady, N.Y.

[73] Assignee: General Electric Company, Schenectady, N.Y.

[22] Filed: May 29, 1975

[21] Appl. No.: 581,807

[52] U.S. Cl. ................................................. 241/15
[51] Int. Cl.² ........................................ B02C 19/12
[58] Field of Search .................. 241/15, 16, 21, 30, 241/184; 204/181

[56] References Cited
UNITED STATES PATENTS 3,358,937   12/1967   Pearson et al. ...................... 241/15
3,881,661   5/1975   Powers et al. ........................ 241/15

*Primary Examiner*—Granville Y. Custer, Jr.
*Attorney, Agent, or Firm*—Paul R. Webb, II; Joseph T. Cohen; Jerome C. Squillaro

[57] ABSTRACT

A method of preparing a suspension of additive-free beta-alumina particles includes vibromilling water free beta-alumina particles of a diameter larger than 2 microns in an organic fluid having a dielectric constant at 25°C of from 12 to 24 with beta-alumina grinding media. The resulting suspension is useful for forming beta-alumina articles by electrophoretic deposition.

5 Claims, 2 Drawing Figures

METHOD OF PREPARING A SUSPENSION OF ADDITIVE-FREE BETA-ALUMINA PARTICLES

The present invention relates generally to a method of preparing a suspension and, more particularly, is concerned with a method of preparing a suspension of beta-alumina particles.

Beta-alumina suspensions are suitable to produce beta-alumina articles which are useful as solid electrolytes in electrical energy storage devices in a variety of combinations of electrode materials useful over a broad range of operating temperature conditions. For example, a high-energy battery employs an anode of sodium and a cathode of sulfur in which both the sodium and sulfur are in the molten state at operating temperature and are in contact with and separated by an electrolyte of a thin, plate-like article or of a closed end tube of sodium beta-alumina. A high-energy battery can also employ in a similar structure an anode of the sodium type and a halogen cathode separated by the same type of sodium beta-alumina electrolyte. Kummer et al, U.S. Pat. No. 3,404,036 describes the use of a plate-like article of sodium beta-alumina as the solid electrolyte in an energy conversion device. A closed end tube or casing of sodium beta-alumina as the solid electrolyte in a sodium-halogen battery is described in U.S. Pat. No. 3,762,955 issued Oct. 2, 1973, for "Sealed Primary Sodium-Halogen Battery". This patent is assigned to the same assignee as the present application.

In French Patent Addition No. 95,549, which was published on Jan. 22, 1971, there is a discussion of the principal patent 1,597,279 of Dec. 27, 1968. Both the principal patent and patent of addition deal with an improved procedure for making thin specimens of sinterable material, in particular ceramic material such as zirconia. Such specimens can be used as solid electrolytes in fuel cells operating at high temperature.

In the principal patent, such specimens are produced by preparing a homogeneous slurry in a solvent containing a binder. This slurry is then applied to a mandrel, covering it with a layer of uniform thickness which should be thicker than the desired final thickness. The covered mandrel is then isostatically pressed. After removing the mandrel, the specimen is sintered according to the principal French patent.

In the principal patent, a slurry has to contain such an amount of sinterable material and has to be of such viscosity, that one gets a layer of uniform thickness on the mandrel by simply dipping it into the slurry for a sufficient period of time. The slurry is made by suspending zirconia, stabilized by addition of yttrium oxide, in demineralized water containing some polyvinyl alcohol. The particle size of the zirconia should be smaller than 1 micron. This suspension is made in a ball mill. It has to be degassed before the dipping process can take place. After dipping, the mandrel covered by the paste-like layer is isostatically pressed. The mandrel is then removed and the pieces are sintered.

The sintering can consist of a first treatment in oxygen atmosphere at temperatures near 1500°C. This treatment is followed by a second one at 2000° or 2100°C in vacuum or in an inert gas atmosphere. Finally, a third one is made again at 1500°C in air atmosphere in order to reoxidize the product. As a result, one gets specimens which have a very homogeneous structure and are perfectly leak tight.

The dipping process is a very delicate operation especially if one wants to obtain a very uniform thickness without subsequent machining. The dipping process is still very time consuming, but compared with an earlier method of fabricating thin materials, which consisted of spraying a homogeneous slurry onto a heated mandrel, it is much quicker.

The patent of addition also relates to a procedure for fabricating specimens of sinterable material, in particular ceramic material. The material is first deposited onto a suitable mandrel. This is followed by an isostatic pressing process. Only then can one sinter the samples. The patent of addition discloses the use of electrophoretic deposition to form or shape the material to be sintered. The material is first suspended in a suitable liquid and the particles are given an electric charge. The material is then deposited onto a mandrel placed in this suspension. Deposition of material takes place on applying a potential difference between the mandrel and another electrode. For example, with zirconia, one has to suspend the particles in certain polar organic vehicles. One can use nitromethane as the vehicle to which one adds small amounts of benzoic acid. One can also use a mixture of acetone and ethyl alcohol containing small amounts of nitrocellulose. Once the deposition has been made the operations are continued as described in the principal patent mentioned above. The pieces are isostatically pressed and afterwards sintered.

The patent of addition describes that in order to electrically charge the zirconia particles, one suspends 20 grams of zirconia with a grain size smaller than one micron (and which has been stabilized by addition of some yttrium oxide) in 100 grams of nitromethane. This suspension is made within 15 minutes at room temperature in a ball mill. Afterwards one gram of benzoic acid is added to the suspension and one again ball mills for about 15 minutes. The suspension of the charged zirconia particles is then transferred to a stainless steel beaker. Constant stirring has to be applied during the deposition. This can be carried out with a magnetic stirrer. One can then deposit the particles onto a mandrel. To do so, one dips the cylindrical, electrically-conducting mandrel into the beaker. The mandrel is rotated. Then one applies a certain potential difference between the mandrel and the stainless steel beaker containing the suspension. This results in the deposition of zirconia particles on the mandrel. The potential difference can be, for example, between 30 and 500 volts.

In order to get deposition of zirconia particles onto the mandrel, one has to apply a potential difference of about 300 volts between the mandrel and the beaker. A zirconia layer is deposited onto the mandrel when this potential difference is applied. The distance between the external surface of the mandrel and the internal wall of the beaker is about 2 centimeters. Under these conditions, in order to get a wall thickness of about 200 microns after isostatically pressing and sintering, one has to apply the necessary potential difference for about 5 seconds.

In the case of the zirconia particles suspended in nitromethane, the polarity of the charged particles is positive as inferred from the fact that the polarity of the mandrel has to be negative. On the other hand, when the zirconia particles are suspended in a solution containing one-third acetone and two-thirds ethyl alcohol and containing one percent of nitrocellulose as an organic binder, the polarity of the particles is negative.

As stated in the principal patent, before isostatically pressing the samples, one can cover them with a protective layer which is applied to the outer face. All details given in the principal patent about the isostatic pressing and the sintering also apply to the patent of addition. Deposition by means of electrophoresis has the advantage that a wide variety of desired shapes of mandrels can be used. This allows one to obtain articles other than discs or tubes.

I understand that sodium beta-alumina can be formed in accordance with the above French patent addition. Further, in copending allowed patent applications Ser. No. 400,047 now U.S. Pat. No. 3,900,381 issued Aug. 19, 1975 and Ser. No. 400,046 now U.S. Pat. No. 3,896,018, issued July 22, 1975, filed Sept. 24, 1973 and Ser. No. 403,454 now U.S. Pat. No. 3,896,019, issued July 22, 1975, filed Oct. 4, 1973, and all entitled "Method of Making Beta-Alumina Articles", there are described and claimed methods which are improvements over the above French patent addition. U.S. Pat. No. 3,881,661 includes an improved milling method over the above copending patent applications and over the above French patent and French patent addition. The present application is directed to an improved method of preparing an electrophoretic suspension of beta-alumina particles. Such particles can be formed electrophoretically into articles which are useful as solid electrolytes in various types of sodium batteries. U.S. Pat. No. 3,881,661 is an improvement over the above copending applications and the above French patent and French patent addition in providing the unique steps of vibromilling water free beta-alumina particles of a diameter larger than 20 microns in a particular organic fluid with a zirconia grinding media for a specific time period. These copending allowed applications are assigned to the same assignee as the present application. These allowed copending applications and the subject matter thereof are hereby incorporated by reference in the present application.

Both the above French patent and French patent addition describe suspending zirconia with a grain size smaller than one micron in nitromethane. A suspension is then prepared by employing a ball mill for 15 minutes. Benzoic acid is added to the suspension and it is ball milled again for about 15 minutes. The suspension of the charged zirconia particles is transferred to a stainless steel beaker for deposition. While both the subject French patent and the French patent addition employ particles with a grain size less than 1 micron in size, there is no description of any method for preparing particles in a grain size less than 1 micron. The above French patent, the above French patent addition, and the above copending patent applications fail to teach, suggest, or describe applicant's present invention in which a beta-alumina grinding media is employed to produce a suspension of additive-free beta-alumina particles wherein a majority of the particles have a diameter in the range of from 1 to 2 microns.

An article No. 11 entitled "Production of $\beta$-Al$_2$O$_3$ Electrolyte" appeared by Wynn Jones and L. J. Miles in Proceedings of the British Ceramic Society, No. 19, 1970, pages 161–178. Beta-alumina electrolyte has been prepared, according to the article, in the form of long thin tubes by isostatic pressure molding of a mixture of alpha-alumina and sodium aluminate followed by reaction sintering between 1600° and 1900°C in an inductively heated furnace thereby converting the material to beta-alumina. A 5 minute firing time is used by moving the pressed tube through a 2.5 inch hot zone at 0.5 inch per minute. On page 164 of this article, it is described that the alpha-alumina and sodium aluminate are dry milled by vibromilling with alumina cylinders for periods of up to 48 hours to achieve grinding and homogenization. The particles were isostatically molded at pressure of 30,000 lb-f/in$^2$.

As opposed to applicant's invention, this article describes vibromilling alpha-alumina and sodium aluminate in the absence of a vehicle with alumina cylinders for periods up to 48 hours. The particles are then isostatically pressed and reaction sintered.

The primary object of my invention is to provide an improved method of preparing a suspension of additive-free beta-alumina particles.

In accordance with one aspect of my invention, a method of preparing a suspension of beta-alumina particles includes vibromilling water-free beta-alumina particles of a diameter larger than 2 microns in an organic fluid having a dielectric constant at 25°C of from 12 to 24 with beta-alumina grinding media.

Figure 2:
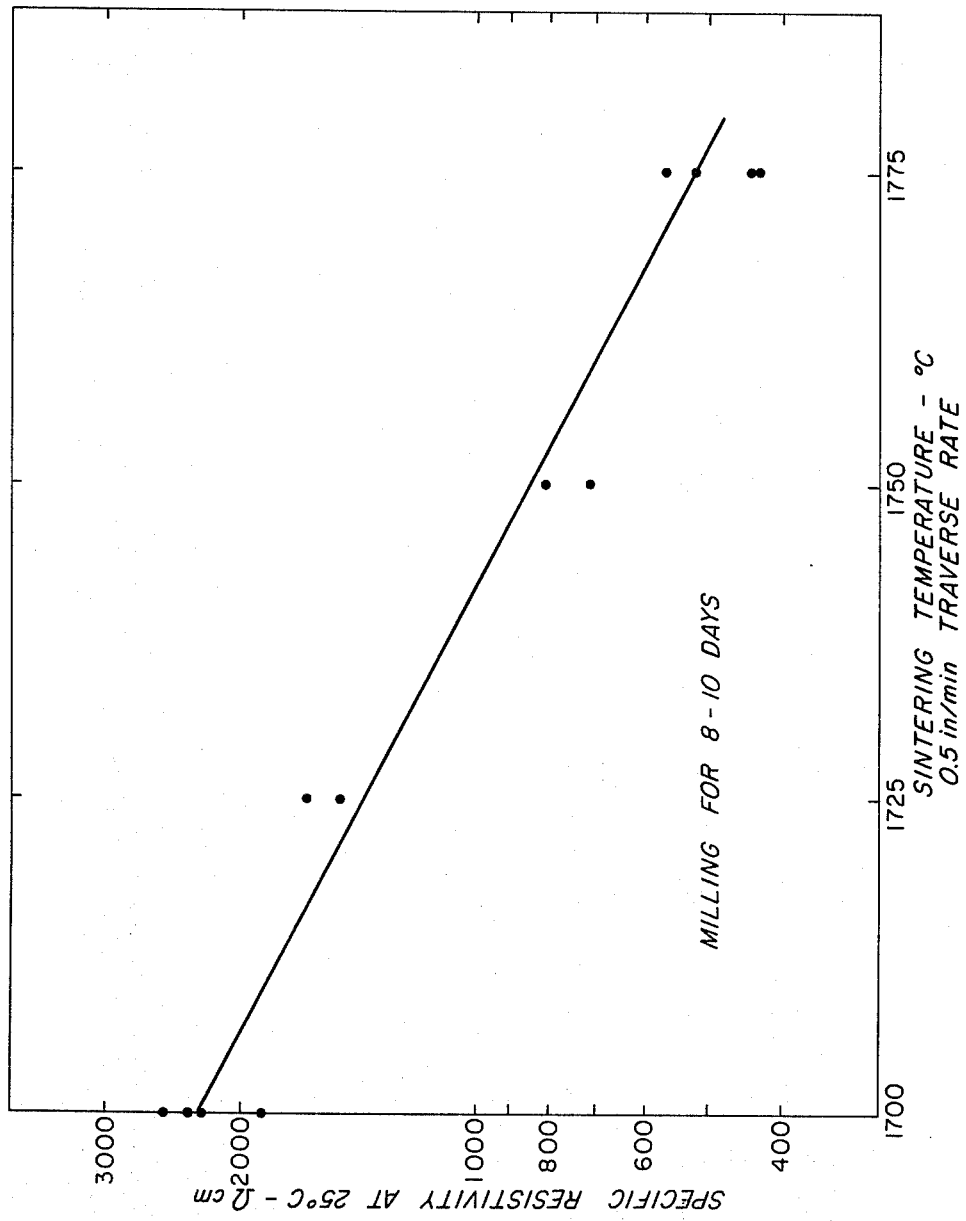

These and various other objects, features and advantages of the invention will be better understood from the following description taken in connection with the accompanying drawing in which:

FIG. 1 includes four plots of the densities of beta-alumina articles formed by electrophoretic deposition from my suspension of additive-free beta-alumina. Each plot, which is identified by number of milling days, shows article density in grams per cubic centimeter versus sintering temperature in degrees centigrade with a sintering rate of 0.5 inch per minute traverse rate; and FIG. 2 is a plot of the specific resistivity at 25° in ohms centimeter versus sintering temperature in degrees centigrade with a sintering rate of 0.5 inch per minute traverse rate of beta-alumina articles formed by electrophoretic deposition from my suspension of additive-free beta-alumina. The resulting suspensions included eight to ten days of milling of the beta-alumina particles by the beta-alumina grinding media.

My method of preparing a suspension of additive-free beta-alumina particles provides a suspension which can be employed in electrophoretic deposition in above copending patent applications Ser. Nos. 400,046 and 400,047 or which can be employed to provide beta-alumina particles in above U.S. Pat. No. 3,881,661 to form beta-alumina articles.

I found an improved method of preparing a suspension of additive-free beta-alumina particles from water free beta-alumina. As described in the above-referenced three copending applications Ser. Nos. 400,046, 400,047 and 403,454, and in the above-mentioned U.S. Pat. No. 3,881,661, zirconia is the preferred grinding media. Alpha-alumina is also mentioned as a grinding media. Zirconia grinding media is dense, mills fast and has low wear. Some zirconia is introduced during milling into the beta-alumina. Alpha-alumina is not as dense as zirconia and mills slower. Its major disadvantage is that alpha-alumina contaminates the beta-alumina particles by reducing seriously the soda content thereof resulting possibly in adverse effect on the electrical resistivity of the subsequently sintered beta-alumina article.

However, I found that the employment of beta-alumina grinding media was not contaminating to the beta-alumina particles resulting in additive-free beta-alumina particles. The beta-alumina grinding media is not as dense as zirconia or alpha-alumina grinding media but it wears less during milling than alpha-alumina.

I found that the suspension of beta-alumina particles for the beta-alumina grinding media can be produced in accordance with copending patent applications Ser. Nos. 400,046 or 400,047, or in accordance with U.S. Pat. No. 3,881,661. The beta-alumina particles from the beta-alumina suspension can be formed into beta-alumina grinding media in accordance with copending patent application Ser. No. 403,454. A suspension was prepared containing 150 grams of water-free Alcoa XB-2 beta-alumina with particles of a diameter greater than 20 microns, the beta-alumina particles having been modified by the inclusion of one percent MgO, 0.188 gram aluminum stearate, and 300 cubic centimeter of n-amyl alcohol. The suspension was vibromilled for eighteen hours using 1800 grams of zirconia grinding cylinders. The above suspension, its preparation, milling and resulting suspension are described in detail in copending application Ser. No. 400,046. After milling, the resulting powder was allowed to settle from the suspension. Supernatant liquid was decanted, and the powder was air dried. The cake was broken up and further dried in a vacuum oven at 220°C. The powder was then hydrostatically pressed into ⅝ in. diameter cylinders at 25,000 psi pressure. These cylinders were cut into slugs, about ⅝ in. in diameter by ⅝ in. in length. They were sintered at 1700°C at a traverse rate through the sintering furnace of 0.5 in. per minute. The cylinders were very fine grained and appeared to be uniformly sintered throughout. The fired density measured on two cylinders was 3.177 and 3.189 grams per cubic centimeter. A plurality of grinding cylinders were obtained in this manner.

A suspension was prepared containing 150 grams of water-free Alcoa XB-2 beta-alumina with an aggregate particle size greater than 2 microns, 0.188 gram aluminum stearate and 300 cubic centimeters of n-amyl alcohol. The suspension was vibromilled for 6 days using 900 grams of the above-described beta-alumina grinding media to break up the aggregates and the crystallizes and to charge the particles. The resulting additive-free beta-alumina having a majority of particles with a size in the range of from 0.5 to 2 microns in the suspension after removal of the grinding media were electrophoretically deposited on a mandrel, the deposit was dried, and the deposit was removed as described in copending patent application Ser. No. 400,046. The sintering of the deposit at a traverse rate through the furnace of 0.5 in. per minute was accomplished as described in copending patent application Ser. No. 403,454. The resulting device was an additive-free beta-alumina article. The article had a density measured at 3.20 grams per cubic centimeter when fired at 1750°C.

I found that when I milled water-free beta-alumina with an aggregate particle size greater than 20 microns, such as about 40 microns, to a particle size wherein a majority of the particles have a size in the range of from 0.5 to 2 microns, at least 6 days of milling were required to provide the subsequently sintered beta-alumina particles with a fired density of 3.20 grams. The milling time was reduced by employing initially waterfree beta-alumina particles with a median size greater than 2 microns, such as in the range of 3 to 5 microns, but substantially less than an aggregate particle size greater than 20 microns.

As it is shown in FIG. 1 of the drawing, the additive-free particles produced from an initial aggregate particle size of about 40 microns are sintered successfully at 1750°C to provide a density of 3.20 grams per cubic centimeter after 6 days of milling. The aggregate particle size was reduced during milling wherein a majority of the resulting particles had a size in the range of 0.5 to 2 microns. When such aggregate particles were milled for 4 days, the density was substantially below the desired 3.20 grams per cubic centimeter. When the milling was increased to 8 days with the same size initial aggregate particles, the desired density was obtained upon sintering at a lower temperature of 1725°C. When the milling was increased further to a maximum of 10 days, the desired density of 3.20 grams per cubic centimeter was exceeded and successful sintering was obtained at 1725°C. Thus, with initial aggregate particle size of a diameter greater than 20 microns, at least 6 days of milling is required. However, with initial particles with a median size greater than 2 microns but substantially less than an aggregate size of 20 microns, the milling time was reduced to one day of milling with a subsequent density of 3.22 grams per centimeter when sintered as above described at 1750°C. My method results in providing a suspension of additive-free beta-alumina particles.

FIG. 2 shows the specific resistivities of a number of additive-free beta-alumina articles formed from my above-described suspensions which were milled for either 8 or 10 days. The specific number of milling days for the particle article is not identified. The sintering temperature in °C with a 0.5 in. per minute traverse sintering rate is plotted against specific resistivity at 25°C in ohms centimeter. The specific resistivities were measured at room temperature.

Examples of additive-free beta-alumina suspensions and articles made in accordance with the method of my invention are as follows:

EXAMPLE I

Suspensions of beta-alumina particles were prepared to provide 5000 grams beta-alumina grinding media in cylinder form in accordance with copending patent application Ser. No. 400,046 and in accordance with U.S. Pat. No. 3,881,661. Each suspension after milling provided 150 grams of beta-alumina particles for grinding media. The beta-alumina particles from the beta-alumina suspension were formed subsequent into beta-alumina grinding media in accordance with copending patent application Ser. No. 403,454. Each suspension was prepared containing 150 grams of water free Alcoa XB-2 beta-alumina with an aggregate particle size of about 40 microns, the beta-alumina particles having been modified by the inclusion of one percent MgO, 0.188 gram aluminum stearate, and 300 cubic centimeter of n-amyl alcohol. The suspension was vibromilled for eighteen hours using 1800 grams of zirconia grinding cylinders. Each of the above suspensions, its preparation, milling and resulting suspension are described in detail in copending application Ser. No. 400,046. After milling, the resulting powder from each suspension was allowed to settle from the suspension. Supernatant liquid was decanted, and the powder was air dried. The cake was broken up and further dried in a vacuum oven at 220°C. The powder was then hydrostatically pressed into ⅝ in. diameter cylinders at 25,000 psi pressure.

These cylinders were cut into slugs, about ⅝ in. in diameter by ⅝ in. in length. They were sintered in accordance with copending patent application Ser. No. 403,454 at 1700°C through a preheated oxygen oxidizing atmosphere furnace at a controlled passage rate of 0.5 in. per minute. The cylinders were very fine grained and appeared to be uniformly sintered throughout. The fired density measured on two cylinders was 3.177 and 3.189 grams per cubic centimeter.

EXAMPLES II–VII

Six suspensions were prepared which are identified as suspension 1–6 corresponding to Examples II–VII. Each suspension contained 150 grams of water-free Alcoa XB-2 beta-alumina with an aggregate particle size of about 40 microns, aluminum stearate and 300 cubic centimeters of n-amyl alcohol. Suspensions 1, 5 and 6 contained 0.188 gram aluminum stearate. Suspensions 2, 3 and 4 contained 0.075, 0.15 and 0.2 gram aluminum stearate, respectively. Each suspension employed 900 grams of the above-described beta-alumina grinding media. Some of the grinding media was used in more than one suspension. Suspension 1 was vibromilled for 4 days while suspensions 2, 3 and 4 were vibromilled for 6 days. Suspension 5 was vibromilled for 8 days while suspension 6 was vibromilled for 10 days. The resulting additive-free beta-alumina particles in each suspension after removal of the grinding media were electrophoretically deposited on mandrels to provide five deposits. The resulting particles had a majority of the particles with a size in the range from 0.5 to 2 microns. Each deposit was dried, and the deposit was removed as described in copending patent application Ser. No. 400,046. The sintering of the various deposits at a traverse rate through the preheated oxygen oxidizing atmosphere furnace at 0.5 in. per minute was accomplished at different temperatures as described in copending patent application Ser. No. 403,454. Each resulting device was an additive-free beta-alumina article. Five articles were produced from each suspension.

As it is shown in FIG. 1, the density of various deposits with various milling times were plotted against various sintering temperatures in °C at a constant traverse rate. Four deposits were sintered from initial suspension 1, while twelve deposits were sintered from initial suspensions 2, 3 and 4. Four deposits were sintered from initial suspension 5 while five deposits were sintered from initial suspension 6. Each deposit, which was sintered, is shown as a separate point in FIG. 1. From FIG. 1, it is shown that a satisfactory additive-free beta-alumina article was produced with a desired density measured at 3.20 grams per cubic centimeter after 6 days of initial milling and at a subsequent sintering temperature of 1750°C. Satisfactory articles were produced after 8 and 10 days of initial milling at even a lower subsequent sintering temperature of 1725°C.

EXAMPLE VIII

FIG. 2 shows the specific resistivity at 25°C in ohms centimeter of 12 additive-free beta-alumina articles prepared from various suspensions with 8 or 10 days of milling time. The sintering temperature in °C is shown for each of the 12 articles.

EXAMPLE IX

A suspension was prepared generally in accordance with Examples II–VII except that water-free Alcoa XB-2 superground beta-alumina was employed. This beta-alumina has particles with a median size in the range of 3 to 5 microns. In accordance with the above Examples II–VII, the suspension was vibromilled but only for 1 day or 24 hours. Four deposits were sintered from the suspension. One deposit was sintered at a temperature of 1750°C at a traverse rate of 0.5 in. per minute. The resulting satisfactory additive-free beta-alumina article provided a desired density measured at 3.22 grams per cubic centimeter.

While other modifications of the invention and variations thereof which may be employed within the scope of the invention have not been described, the invention is intended to include such as may be embraced within the following claims:

What I claim as new and desire to secure by Letters Patent of the United States is:

1. A method of preparing a suspension of additive free beta-alumina particles which comprises providing water-free beta-alumina with a particle size greater than 2 microns, adding the particles to an organic fluid vehicle having a dielectric constant at 25°C of from 12 to 24, adding beta-alumina grinding media, vibromilling the beta-alumina particles for a period of time to reduce the particle size wherein a majority of the particles have a size in the range of from 0.5 to 2 microns thereby providing a suspension of the additive-free beta-alumina particles in the organic fluid, and removing the suspension from the grinding media.

2. A method as in claim 1, in which the vibromilling is continued for a period of from 144 to 240 hours.

3. A method as in claim 1, in which the vibromilling is continued for a period of 24 hours.

4. A method as in claim 1, in which 0.05 to 0.5 percent aluminum stearate by weight of the beta-alumina particles is added initially to the organic fluid vehicle.

5. A method as in claim 4, in which the vibromilling is continued for a period of from 144 to 240 hours.

* * * * *